US 8,601,006 B2

(12) United States Patent
Hattori et al.

(10) Patent No.: US 8,601,006 B2
(45) Date of Patent: Dec. 3, 2013

(54) INFORMATION FILTERING APPARATUS

(75) Inventors: Gen Hattori, Fujimino (JP); Chihiro Ono, Fujimino (JP); Yasuhiro Takishima, Fujimino (JP)

(73) Assignee: KDDI Corporation, Tokyo (JP)

( * ) Notice: Subject to any disclaimer, the term of this patent is extended or adjusted under 35 U.S.C. 154(b) by 463 days.

(21) Appl. No.: 12/635,003

(22) Filed: Dec. 10, 2009

(65) Prior Publication Data

US 2010/0161622 A1    Jun. 24, 2010

(30) Foreign Application Priority Data

Dec. 19, 2008  (JP) ................. 2008-323712

(51) Int. Cl.
*G06F 7/00* (2006.01)
*G06F 17/30* (2006.01)

(52) U.S. Cl.
USPC .......................... 707/754; 707/749

(58) Field of Classification Search
USPC ............... 707/749, 731, 732, 999.006, 754
See application file for complete search history.

(56) References Cited

U.S. PATENT DOCUMENTS

| | | | |
|---|---|---|---|
| 6,751,614 B1* | 6/2004 | Rao | 1/1 |
| 7,003,519 B1* | 2/2006 | Biettron et al. | 707/711 |
| 7,783,622 B1* | 8/2010 | Vandermolen et al. | 707/708 |
| 2003/0208485 A1* | 11/2003 | Castellanos | 707/5 |
| 2009/0177754 A1* | 7/2009 | Brezina et al. | 709/206 |

FOREIGN PATENT DOCUMENTS

| | | |
|---|---|---|
| JP | 9054780 | 2/1997 |
| JP | 2008-58687 | 3/2008 |

OTHER PUBLICATIONS

Mike Moran et al., Is Google Missing Your Web Site?, Nov. 4, 2005, Article is provided courtesy of IBM Press, http://www.ibmpressbooks.com/articles/article.asp?p=423776.*
"Scatter/Gather: a cluster-based approach to browsing large document collections", by D. Cutting et al., *Proc. Of the 15th Annual International ACM SIGIR Conference on Research and Development in Information Retrieval*, pp. 318-329, 1992.
Japanese Office Action from JP 2008-323712, dated May 8, 2013.
Translation of Japanese Office Action JP 2008-323712, dated May 8, 2013.

* cited by examiner

*Primary Examiner* — Alexey Shmatov
(74) *Attorney, Agent, or Firm* — Westman, Champlin & Koehler, P.A.

(57) ABSTRACT

A search unit 11 presents a Web search result report to a client terminal 20. A theme space construction unit 12 updates theme information within a theme information DB 13 by a user-acquired information feedback from the client terminal 20, and performs a Web search to construct a theme space. The search unit 11 includes an exhaustivity calculation unit that calculates exhaustivity being a ratio of a user-acquired part to a part of an entire target theme. Moreover, the search unit 11 includes a difference calculation unit that calculates a difference between a "user-acquired" range when a user has acquired target Web pages and a user-acquired range before that, and a relevance calculation unit that calculates relevance of the target Web pages to the target theme.

15 Claims, 5 Drawing Sheets

IMAGE OF VOCABULARY SPACE

Fig. 8

|       | TF | IDF | TF-IDF |
|-------|----|-----|--------|
| A     | 2  | 5   | 10     |
| B     | 1  | 10  | 10     |
| C     | 1  | 9   | 9      |
| D     | 2  | 4   | 8      |
| E     | 1  | 7   | 7      |
| F     | 1  | 6   | 6      |
| TOTAL | 8  |     |        |

Fig. 9

|       | TF | IDF | TF-IDF | WORD SCORE | WORD SCORE RANKING |
|-------|----|-----|--------|------------|--------------------|
| A     | 2  | 5   | 10     | 0.0347     | 6                  |
| B     | 1  | 10  | 10     | 0.1042     | 2                  |
| C     | 1  | 9   | 9      | 0.1250     | 1                  |
| D     | 2  | 4   | 8      | 0.0556     | 5                  |
| E     | 1  | 7   | 7      | 0.0729     | 4                  |
| F     | 1  | 6   | 6      | 0.1042     | 2                  |
| TOTAL | 8  |     |        |            |                    |

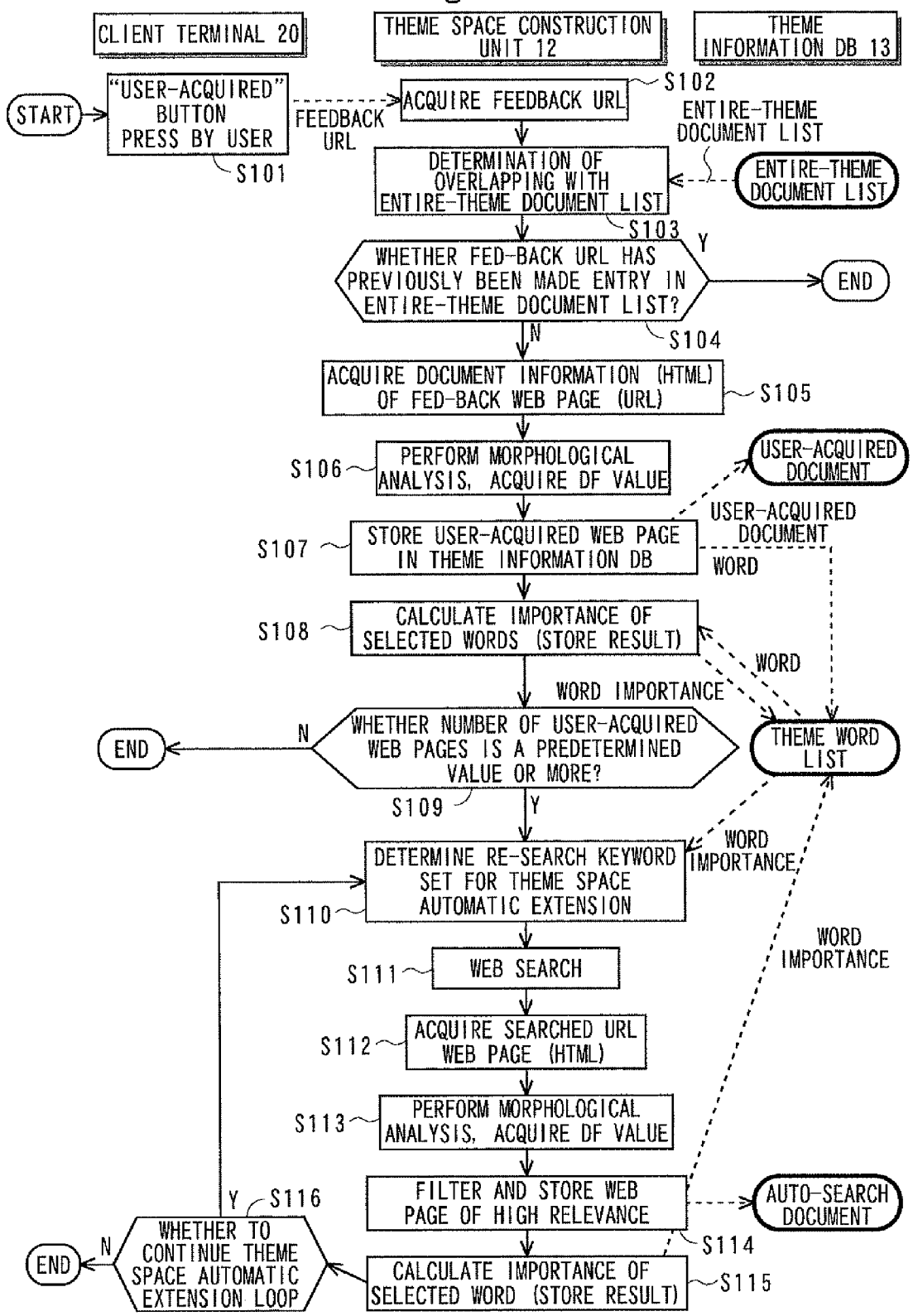

INFORMATION FILTERING APPARATUS

The present application is claims priority of Japanese Patent Application Serial No. 2008-323712, filed Dec. 19, 2008, the content of which is hereby incorporated by reference in its entirety.

BACKGROUND OF THE INVENTION

1. Field of the Invention

The present invention relates to an information filtering apparatus, and more particularly, to an information filtering apparatus for collecting and filtering information relating to a specific theme from the Web and the like, exhaustively and efficiently.

2. Description of the Related Art

A great variety of information exists on the Web, and it requires a great amount of time and effort on the part of a user to filter and collect information that satisfies his/her request from such information. Conventionally, it has been proposed to reduce the burden of information collecting work by using the history of a user's past information filtering or by contriving a technique for filtering information.

Patent Literature 1 proposes a learning apparatus that automatically learns individual user preferences for information provided from electronic information media and the like, from a user's actual evaluation values, and preferentially presents information suitable for individual users by use of the learning result.

Non-Patent Literature 1 proposes a method for filtering information required by a user by repeating, for document collections, a process of clustering at a system side, selection at a user side, then integration and clustering at the system side, and selection at the user side, such as a system clustering document collection based on the content, and a user selecting a cluster, the system integrating and re-clustering the selected content, and the user selecting a cluster.

Patent Literature 1: Japanese Published Unexamined Patent Application No. H09-54780

Non-Patent Literature 1: Douglass R. Cutting, David R. Karger, Jan O. Pedersen, and John W. Tukey, "Scatter/Gather: A Cluster-based Approach to Browsing Large Document Collections," Proc. of the 15th Annual International ACM SIGIR Conference on Research and Development in Information Retrieval, pp. 318-329, 1992.

The learning apparatus of Patent Literature 1 is for eliminating the necessity of considering what preference a user has for his/her required information so as to allow easy selection of the information required by the user from a plurality of pieces of information. However, there exist on the Web a large number of pages with overlapping content. In the learning apparatus of Patent Literature 1, this has not been taken into consideration, and therefore when information is collected from the Web by use of this apparatus, a large number of information including pages with overlapping content is to be presented. Because the user must finally browse the large number of information to select required information, there is a problem that the burden of information collecting work on the user increases with an increasing number of information to be presented.

According to the method of Non-Patent Literature 1, a user can filter similar documents by using clustering in the system and select required information. However, in this method as well, as in the learning apparatus described in Patent Literature 1, the existence of documents with overlapping content has not been taken into consideration, and therefore, there is a problem that the burden on the user in final information filtering increases with an increasing number of documents.

SUMMARY OF THE INVENTION

It is an object of the present invention to provide an information filtering apparatus capable of collecting information relating to a specific theme from the Web and the like, and filtering the information exhaustively and efficiently.

In order to accomplish the object, a first feature of this invention is that an information filtering apparatus for collecting and filtering information relating to a target theme, comprises, an exhaustivity calculation unit that calculates a ratio of a range of a user-acquired information group to a range of a target theme-related information group in a vocabulary space formed of a collection of words as exhaustivity, and a sending unit for sending out the exhaustivity calculated by the exhaustivity calculation unit to a client terminal.

A second feature of this invention is that the information filtering apparatus comprises a difference calculation unit that calculates a difference between a range of a user-acquired information group when a user has acquired target information and a range of a user-acquired information group before that, wherein the sending unit sends out the difference calculated by the difference calculation unit together with the exhaustivity.

A third feature of this invention is that the information filtering apparatus comprises a relevance calculation unit that calculates relevance of target information to a target theme, wherein the sending unit sends out the relevance calculated by the relevance calculation unit together with the exhaustivity.

A fourth feature of this invention is that the information filtering apparatus comprises a difference calculation unit that calculates a difference between a range of a user-acquired information group when a user has acquired target information and a range of a user-acquired information group before that, and a relevance calculation unit that calculates relevance of target information to a target theme, wherein the sending unit sends out the difference calculated by the difference calculation unit and the relevance calculated by the relevance calculation unit together with the exhaustivity.

A fifth feature of this invention is that the information filtering apparatus makes the client terminal preferentially present information having a greater difference calculated by the difference calculation unit and having a greater relevance calculated by the relevance calculation unit.

A sixth feature of this invention is that the information filtering apparatus comprises a theme space construction unit that generates a search keyword set for searching for information relating to a target theme by using a "user-acquired" history being a feedback of information determined to have been acquired by a user, collects information by use of the search keyword set, and extracts words relating to the target theme from the collected information to construct a range of a target theme-related information group.

A seventh feature of this invention is that the information filtering apparatus repeats a process of further generating a search keyword set for searching for information relating to a target theme from information based on which the range of a target theme-related information group has been constructed, collecting information by use of the search keyword set, and extracting words relating to the target theme from the collected information to construct a range of a target theme-related information group.

A eighth feature of this invention is that the theme space construction unit in the information filtering apparatus has a unit that calculates importance of words in terms of a target theme by using TF-IDF and a thesaurus, and extracts words relating to the target theme in consideration of the importance.

A ninth feature of this invention is that the theme space construction unit in the information filtering apparatus stores the extracted words and importance thereof, and information being a basis thereof in a theme information database as theme information.

A tenth feature of this invention is that information to be stored in the theme information database is URLs of information used for the construction of a range of a target theme-related information group and content thereof, and a flag has been applied to user-acquired information thereof.

A eleventh feature of this invention is that the exhaustivity calculation unit in the information filtering apparatus calculates a ratio of a sum of the importance of words included in the range of a user-acquired information group to a sum of the importance of words included in the range of a target theme-related information group as exhaustivity.

In the present invention, the exhaustivity of user-acquired information in terms of a target theme is calculated and sent out to a client terminal, which therefore allows a user to grasp the status of information acquisition from the exhaustivity presented to the client terminal, and judge whether information acquirement is further necessary. Accordingly, it becomes possible to suppress the processing time and the burden on the user while filtering information at a high exhaustivity.

Moreover, calculating a difference between the range of a user-acquired information group and the range of a user-acquired information group when the user has acquired target information and/or relevance of target information to a target theme and presenting the difference and/or relevance by the client terminal allows the user to filter necessary information in a minimum amount time. For example, preferentially browsing information of which the above-mentioned difference and/or relevance is great, and considering exhaustivity at that time allows minimizing overlapping of browsing information when filtering information.

Moreover, repeating a process of constructing the range of a target theme-related information group by using a "user-acquired" history being a feedback of information determined to have been acquired by a user, and also information based on which the range of a target theme-related information group has been constructed allows extending the range of a target theme-related information group to an optimal range.

Further, when the user browses and determines to have acquired information, indicating with a numerical value at what degree of exhaustivity the user could acquire information to the range of a target theme-related information group further facilitates a judgment as to whether information acquirement is necessary.

BRIEF DESCRIPTION OF THE DRAWINGS

FIG. 8 is a table view showing concrete examples of the TF and IDF values of words.

FIG. 9 is a table view showing the importance and importance ranking of words.

FIG. 10 is a flowchart showing the updating process of theme information in detail.

DETAILED DESCRIPTION OF THE PREFERRED EMBODIMENTS

Figure 1:
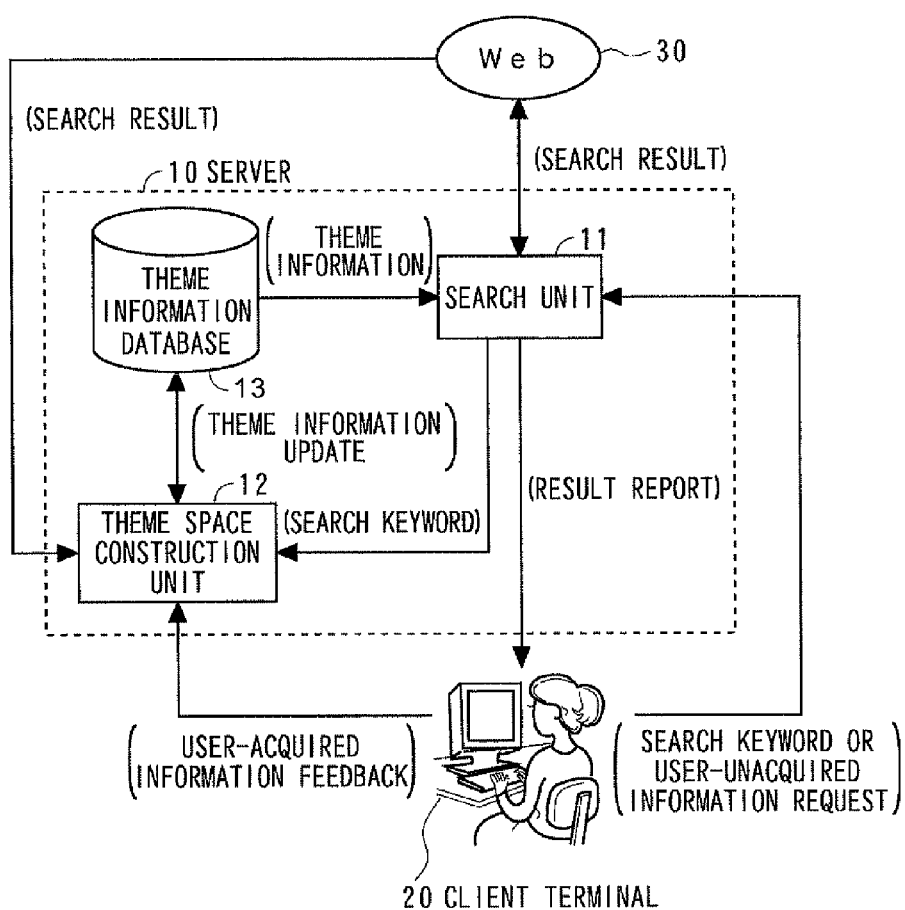
FIG. 1 is a block diagram showing an embodiment of an information filtering apparatus according to the present invention.

Hereinafter, the present invention will be explained with reference to the drawings. FIG. 1 is a block diagram showing an embodiment of an information filtering apparatus according to the present invention. For the present embodiment, the information filtering apparatus is configured as a server 10 that searches for and collects Web pages from the Web.

The server 10 includes a search unit 11, a theme space construction unit 12, and a theme information database (DB) 13. The search unit 11 and the theme space construction unit 12 can be formed either as hardware or as software.

The search unit 11, when a search keyword set is transmitted from a client terminal 20, searches for Web pages on the Web 30 by use of the search keyword set, and presents a result report to the client terminal 20. It suffices to present in the result report, for example, a URL (uniform resource locator) list of retrieved Web pages. A user can browse and acquire the Web pages (document information) in the presented result report.

Moreover, the search unit 11 has an exhaustivity calculation unit, and the exhaustivity calculation unit calculates exhaustivity, which is a ratio of a user-acquired part to an entire part of a target theme. The exhaustivity can be calculated based on, in a vocabulary space formed of a collection of words, ranges of respective parts. More specifically, the exhaustivity can be calculated as a ratio of a range of a user-acquired Web page group to a range of a target theme-related Web page group. As will be described later, the target theme-related Web page group can be acquired in a Web search using theme information, and the user-acquired Web page group can be acquired from a "user-acquired" history of a user-acquired information feedback.

Further, the search unit 11 has a difference calculation unit and a relevance calculation unit, the difference calculation unit calculates a difference between the range of a user-acquired Web page group when the user has acquired target Web pages and the range of a user-acquired Web page group before that, and the relevance calculation unit calculates relevance of target Web pages to the target theme.

Figure 2:
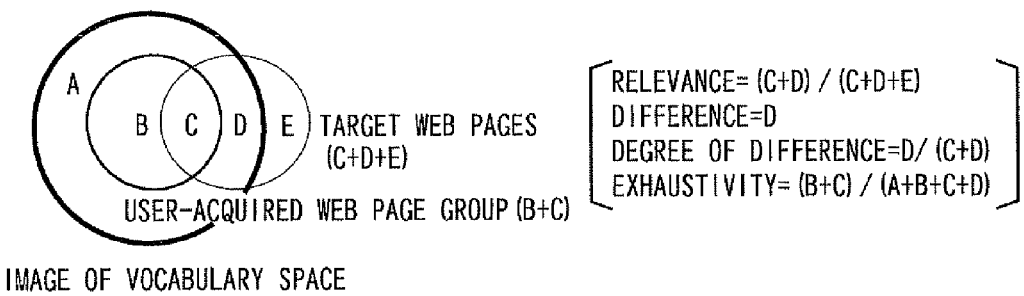
FIG. 2 is a conceptual view showing the exhaustivity, difference, and relevance.

FIG. 2 is a conceptual view showing the exhaustivity, difference, and relevance. This figure expresses the vocabulary space formed of a collection of words as an image. Here, (A+B+C+D) indicates a range of a target theme-related Web page group, (B+C) indicates a range of a user-acquired Web page group, and (C+D+E) indicates a range of target Web pages. In this case, the exhaustivity is calculated by (B+C)/(A+B+C+D). Moreover, the difference is calculated by D, and the relevance is calculated by (C+D)/(C+D+E). In addition, D/(C+D) indicates a degree of the difference.

Although the exhaustivity, difference, and relevance can be calculated based on the number of words contained in each range, it is preferable to calculate these in consideration of the importance of words (word scores). The importance of words will be described later. The exhaustivity with the importance of words taken into consideration is calculated by formula (1).

$$\text{Exhaustivity} = \frac{\sum \left( \begin{array}{c} \text{importance of words} \\ \text{contained in user-acquired} \\ \text{Web pages} \end{array} \right)}{\sum \left( \begin{array}{c} \text{importance of words} \\ \text{contained in target} \\ \text{theme-related Web pages} \end{array} \right)} \quad \text{[Numerical Formula 1]}$$

Moreover, the search unit 11, when a user-unacquired information request is transmitted from the client terminal 20, acquires user-unacquired Web pages from the theme information DB 13, and presents a search result report thereof to the client terminal 20. The user can browse and acquire the contents of Web pages in the presented result report.

The theme space construction unit 12 updates theme information in the theme information DB 13 based on a theme information feedback from the client terminal 20 based on a judgment that the user has acquired the Web pages. Moreover, the theme space construction unit 12 performs a Web search by using the updated theme information, and constructs a range of a target theme-related Web page group (hereinafter, referred to as a theme space) by a result thereof.

The theme information DB 13 stores theme information. The theme information includes Web pages (URLs and document information) based on which a theme space has been constructed and a list thereof (an entire-theme document list: URLs), and a list of words relating to the target theme extracted from those Web pages (a theme word list). Although the Web pages based on which a theme space has been constructed include user-acquired Web pages and user-unacquired Web pages, the user-acquired Web pages have been added with "user-acquired" flags so as to allow discrimination from the user-unacquired Web pages. The Web pages with "user-acquired" flags form a "user-acquired" history. Moreover, in the theme word list, the word importance in the theme has been applied to each word. The importance of each word has been previously determined and registered for every theme.

Figure 3:
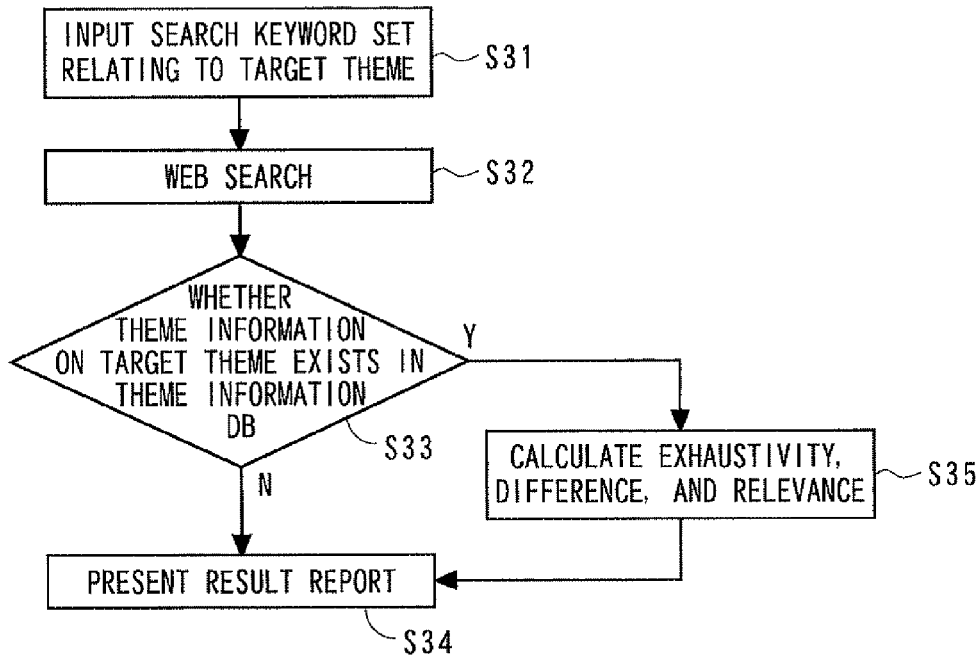
FIG. 3 is a flowchart showing an operation when a search keyword set is input.

Next, operation of the server 10 will be explained. FIG. 3 is a flowchart showing an operation when a search keyword set is transmitted from the client terminal 20 in order to collect Web pages relating to a target theme.

First, when a search keyword set relating to a target theme from the client terminal 20 is input (S31), the search unit 11 executes a Web search by use of the search keyword set (S32) to acquire Web pages. Next, the search unit 11 checks whether theme information on the target theme exists in the theme information DB 13 (S33).

Here, if the theme information does not exist, the search unit 11 presents a result report on only the search result of the Web search (S32) to the client terminal 20 (S34). The above steps S31 to S34 are of a process to be executed when the operation is started from a state where there is no data in the theme information DB 13, such as, for example, collecting Web pages about a new theme, and the point in time where the search keyword set is input to the search unit 11 from the client terminal 20 by a user is a start point. In this case, only Web pages being a result of the Web search are presented to the client terminal 20. In addition, the Web pages are presented by only their URLs so as to allow browsing document information thereof if necessary. The same applies in the following presentation.

When theme information on the target theme exists in the theme information DB 13, the search unit 11 calculates the exhaustivity, difference, and relevance by using the theme information (S35), and presents a result report containing those, user-acquired Web pages, and user-unacquired Web pages to the client terminal 20 (S34). At this time, it is preferable to allow a setting by the client terminal 20 so as to present Web pages in order from a Web page of which the difference or relevance is greater and so as not to present a Web page where the difference or relevance is below a certain threshold value. It is also preferable to preferentially present a Web page of which both the difference and relevance are great. When many Web pages are presented, a technique of page feeding or scrolling can be used.

Figure 4:
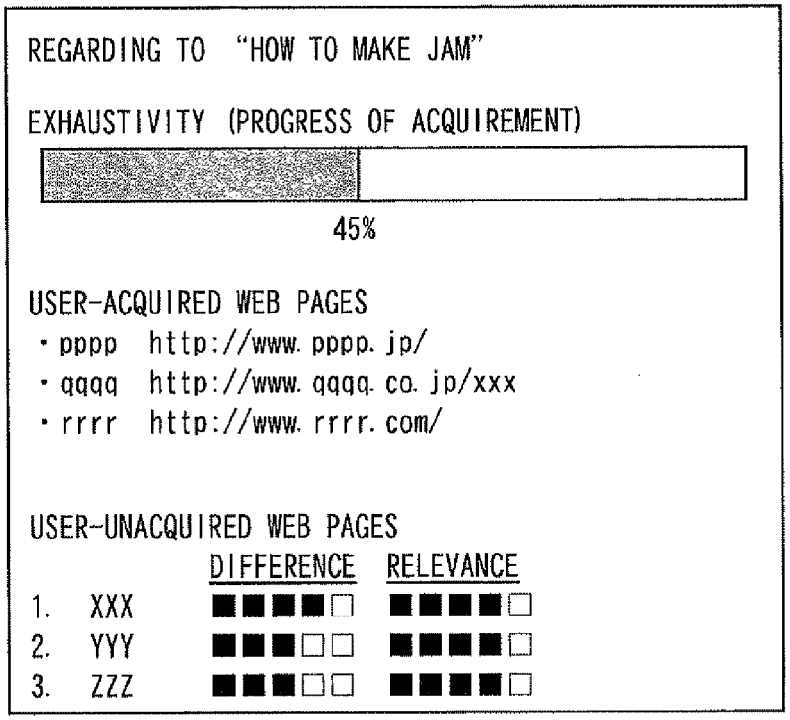
FIG. 4 is a view showing a concrete example of a result report.

FIG. 4 is a view showing a concrete example of a result report. This concrete example is of a result report when it is determined that three Web pages have been acquired. In this figure, "pppp http://www.pppp.jp/," "qqqq http://www.qqqq-.co.jp/xxx," and "rrrr http://www.rrrr.com/" are presented as user-acquired Web pages, and the exhaustivity (progress of acquirement) to the target theme is presented as 45% by a bar graph. Besides the presentation of those, XXX, YYY, and ZZZ are presented as user-unacquired Web pages together with their difference and relevance. In addition, the more the black parts, the greater the difference and relevance, and the user-unacquired Web pages are presented in order from one with a greater difference and relevance.

The user browses the Web pages (document information) presented to the client terminal 20, and performs a user-acquired information feedback to a Web page considered to have been useful. The user-acquired information feedback contains the URL and document information of a Web page determined to have been acquired by the user. The user-acquired information feedback can be performed not only by an explicit operation, such as a user pressing a "user-acquired" button by the client terminal 20, but can be performed also by recognizing an implicit user operation such as the browsing time of a Web page, the number of scroll actions, or the number of user who acquired the Web page. A Web page of which the browsing time is long or the number of scrolling actions is large can be considered to have been acquired by a user, and a Web page of which the number of user who acquired the Web page is large can be considered to have been acquired by the general public including the user.

The theme space construction unit 12 additionally stores the Web page based on the user-acquired information feedback in the "user-acquired" history within the theme information DB 13. Moreover, the theme space construction unit 12 constructs a theme space by using also the additionally stored Web page. Concretely, the theme space construction unit 12 generates a search keyword set for searching for Web pages relating to a target theme from the Web pages of the "user-acquired" history including the additionally stored Web page, performs a Web search by use of this search keyword set and a search keyword set input from the search unit 11 to collect Web pages, and extracts words relating to the target theme from the collected Web pages to construct a theme space. The result report is therefore updated.

It is allowed to further perform the construction (extension) of a theme space automatically and repeatedly. More specifically, the theme space construction unit 12 repeats such a process of generating a search keyword set also from the Web pages collected by the above-mentioned Web search, executing a Web search by use also of the search keyword set, and then extracting words relating to the target theme from the collected Web pages to extend the theme space, until a predetermined condition is satisfied. The result report is sequentially updated also in this case.

Figure 5:
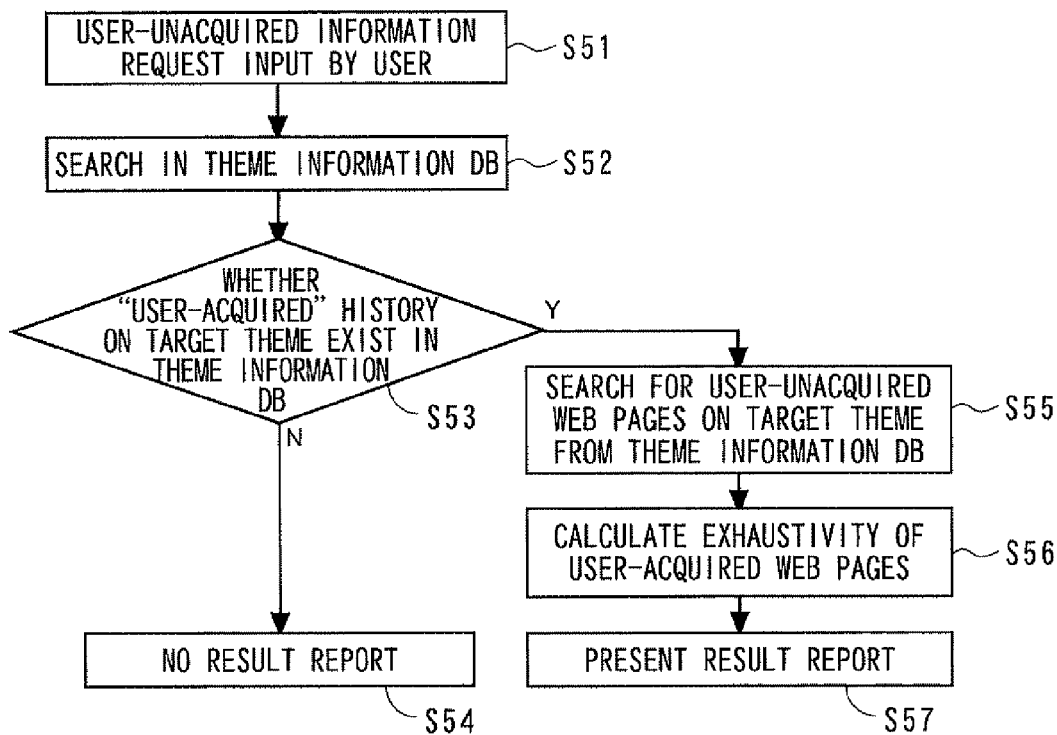
FIG. 5 is a flowchart showing an operation when a user-unacquired information request is input.

FIG. 5 is a flowchart showing an operation when a user-unacquired information request is transmitted from the client terminal 20 in order to present user-unacquired Web pages in the theme information DB 13.

First, when a user-unacquired information request to a target theme is input (S51) from the client terminal 20, the search unit 11 searches in the theme information DB 13 (S52), and checks whether a "user-acquired" history on the target theme exists in the theme information DB 13 (S53). Here, if the "user-acquired" history does not exist, the search unit 11 performs a presentation to that effect to the client terminal 20 (S54).

When the "user-acquired" history on the target theme exists in the theme information DB 13, the search unit 11 searches for user-unacquired Web pages on the target theme from the theme information DB 13 (S55), and calculates a ratio of a user-acquired Web page group to a target theme-related Web page group as exhaustivity (S56). Then, the search unit 11 transmits a result report containing the URLs and the exhaustivity of the user-unacquired Web pages to the client terminal 20. The result report may contain a difference and relevance concerning the user-unacquired Web pages. If the user browses the contents of user-unacquired Web pages in the result report and performs a user-acquired information feedback, the user-unacquired Web pages are modified to user-acquired Web pages and stored. The contents of the result report are therefore updated.

Figure 6:
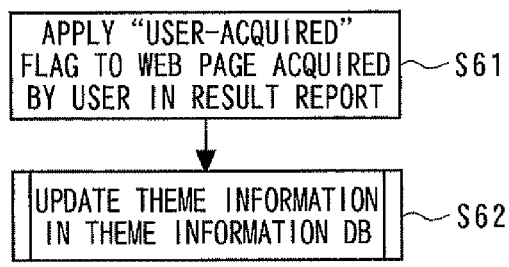
FIG. 6 is a flowchart showing an outline of a user-acquired information feedback process.

FIG. 6 is a flowchart showing an outline of a user-acquired information feedback process. When feeding back user-acquired information, the client terminal 20 applies a "user-acquired" flag to a Web page that has been acquired out of the Web pages presented in a result report, and feeds back the user-acquired information (S61). The theme space construction unit 12 receives the user-acquired information feedback to update theme information in the theme information DB 13 (S62). This updates user-acquired Web pages and a theme word list of the theme information. The "user-acquired" flag is applied for the purpose of allowing to cope with when a user-unacquired information request is transmitted from the client terminal 20 to the search unit 11, as described above.

Figure 7:
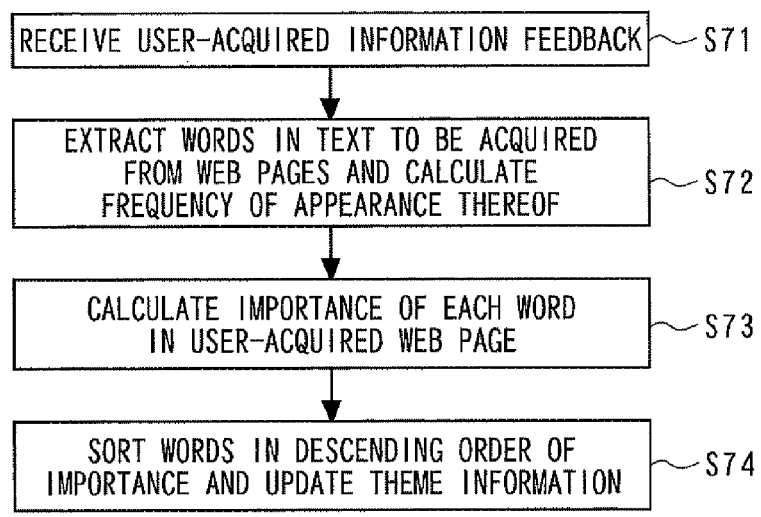
FIG. 7 is a flowchart showing an outline of an updating process of theme information.

FIG. 7 is a flowchart showing an outline of an updating process of theme information (S62) by the theme information DB 13. The theme space construction unit 12 receives a user-acquired information feedback from the client terminal 20 (S71), extracts words in a text to be acquired from Web pages fed back in the user-acquired information, and calculates a frequency of appearance thereof (S72). As the text to be acquired, based on, for example, the distribution of parts of speech or the like, a specific page of the Web pages or a specific paragraph can be selected.

Next, the theme space construction unit 12 calculates the importance of each word (word score) in a user-acquired Web page (S73). The word importance can be calculated based on, for example, TF (term frequency)-IDF (inverse document frequency) and a synonymous relationship. Finally, the theme space construction unit 12 sorts the words in descending order of importance and updates the theme information (S74). In the theme word list, a word relating to the target theme and importance of the word are updated.

The word importance can be calculated according to the following procedures.

(1) First, morphologically analyze a text of the Web page to extract words, and select words to be evaluated. For example, the following may be selected as words to be evaluated.

Noun (sub-classification of part of speech is general or proper noun or sa-hen (verbal) noun)
Verb (5-step conjugation-)
Adjective (2) Next, calculate TF-IDF in terms of a word to be evaluated. The value of TF-IDF represents a frequency of appearance and a deviation of word, and serves as an index of the word importance in the document. FIG. 8 shows concrete examples of TF and IDF values calculated in terms of six words A, B, C, D, E, and F.

(3) Next, check if there is any relation (link) between two words in a thesaurus, and set 1 if there is a link, and if not, set 0. Set 0 for oneself. Links are, for example, defined as follows:

a) Two words have a "broad sense or synonymous" relationship.
b) Two words have a "broad-sense synonymous or synonymous broad-sense" relationship.
c) Two words have a "same broad-sense word or same synonymous word."
d) Two words have a "same broad-sense synonymous word or same synonymous broad-sense word."

(4) Next, calculate the $$\text{Word importance}=(TF*IDF*\text{number of links})/(\text{total of } TFs*(\text{number of word types})^2)$$

In the case of the example of FIG. 8, the total of TFs is 8, and the number of word types is 6 (types) of (A to F). FIG. 9 shows the importance and importance ranking of words A to F. For example, the importance of word B results in the following value.

$$\text{Importance of word } B=(10*3)/(8*6^2)=0.1042$$

FIG. 10 is a flowchart showing the updating process of theme information (S62) by the theme information DB 13 in detail. In the figure, steps to be executed by the theme space construction unit 12 are shown in the center, operations by the client terminal (GUI) 20 are shown on the left side thereof, and information to be stored in the theme information DB 13 is shown on the right side.

First, in the client terminal (GUI) 20, when a user presses a "user-acquired" button to a Web page, the URL of this Web page is fed back to the theme space construction unit 12 (S101).

When the theme space construction unit 12 acquires the fed-back URL of the Web page (S102), it performs an overlapping determination with the entire-theme document list of the theme information DB 13 (S103), and ends the process if there is overlapping (S104). S103 to S104 prevent a Web page identical to an already stored Web page from being stored twice. In the entire-theme document list, the URLs of Web pages already stored as Web pages relating to a target theme have been listed. If there is no overlapping as a result of the determination in S103 (S104), the theme space construction unit 12 acquires document information (HTML) of the fed-back Web page (URL) (S105). Then, the theme space construction unit 12 performs a morphological analysis of a text of the Web page to select words to be evaluated, and acquires a DF value to serve as an index of the importance of each word (S106). In addition, the DF value of each word has been previously calculated and accumulated.

Next, the theme space construction unit 12 stores the fed-back Web page, that is, a user-acquired Web page, as a user-acquired document in the theme information DB 13 (S107). Moreover, the theme space construction unit 12 stores the selected words in the theme word list, then calculates the importance of the selected words, and stores the importance in correspondence with the words in the theme word list (S108). Next, the theme space construction unit 12 determines whether the number of user-acquired Web pages is a predetermined value, for example, 3 or more (S109), and if the certain value or more, proceeds to a process of step S110 onward, while if less than the certain value, ends the process. S109 is provided for the purpose of enhancing the accuracy of the system by designing so as to update the theme information when such a condition that the number of user-acquired Web pages is the certain value or more has been satisfied, and may be omitted.

Next, the theme space construction unit 12 determines a re-search keyword set for a theme space automatic extension (S110). Here, as the re-search keyword set for a theme space automatic extension, a word useful for searching for Web pages relating to the target theme is selected, with reference to the word importance, from the words stored in the theme word list. For example, a word of a certain value or more of importance, a certain number of words of great importance, or a certain number of words of great importance among all parts of speech can be selected as the re-search keyword set.

Next, the theme space construction unit 12 performs a Web search by use of the re-search keyword set for a theme space automatic extension (S111), and acquires Web pages from the Web 30 (S112). The theme space construction unit 12 then performs a morphological analysis of a text of the user-acquired Web pages to select evaluating words, and acquires a DF value to serve as an index of the importance of each word (S113).

Next, the theme space construction unit 12 calculates relevance of each user-acquired Web page to the target theme, selects (filters) a Web page of a high relevance, and stores this Web page in the theme information DB 13 as an auto-search document (S114). Next, the theme space construction unit 12 selects a word to be evaluated from the stored Web page, calculates the importance of this word, and additionally stores the importance along with the word in the theme word list (S115).

Lastly, the theme space construction unit 12 determines whether to continue the theme space automatic extension loop (S116), and if not continuing the theme space automatic extension loop, ends the process, while if continuing the theme space automatic extension loop, repeats the process in steps S110 to S115. The determination in step S116 can be performed based on the number of times of execution of the theme space automatic extension process or the like. For example, it suffices to exit the theme space automatic extension loop when the theme space automatic extension process has been executed three times. Alternatively, it is also possible to exit the theme space automatic extension loop when the order of importance of each word to be stored in the theme word list no longer changes. A theme space is constructed (extended) by sets of words that are additionally stored in sequence in the theme word list as in the above.

An outline of the procedures for collecting and filtering Web pages will be rounded up as follows.

(1) When a search keyword set (for example, "how to make jam") concerning a target theme from the client terminal 20 is input to the search unit 11, (1-1) the search unit 11 searches the Web 30 by use of the search keyword set, and acquires URLs and document information (HTML) of Web pages as a search result.

Moreover, the search unit 11 sends out the search keyword set to the theme space construction unit 12.

(1-2) When theme information on the target theme does not exist in the theme information DB 13, the search unit 11 transmits a result report containing only the URLs of Web pages of the search result to the client terminal 20.

When theme information on the target theme exists in the theme information DB 13, the exhaustivity calculation unit of the search unit 11 calculates a ratio of a user-acquired Web page group to a target theme-related Web page group as exhaustivity. Then, the search unit 11 transmits a result report containing the URLs and the exhaustivity of the user-acquired Web pages and user-unacquired Web pages to the client terminal 20. The result report may contain a difference and relevance concerning the user-unacquired Web pages.

(1-3) The result report transmitted from the search unit 11 is presented by the client terminal 20. The user refers to the result report and browses Web pages if necessary. Then, the user ends the process when the Web pages in the presented result report are judged to have been completely acquired.

When the Web pages in the presented result report are judged to have not been completely acquired, the user browses and acquires a Web page needs to be acquired or a specific part extracted therefrom. The user-acquired Web page is applied with a "user-acquired label," and fed back as user-acquired information to the theme space construction unit 12.

(1-4) The theme space construction unit 12 receives a user-acquired information feedback, and additionally stores the Web page determined to have been acquired in a "user-acquired" history within the theme information DB 13.

(1-5) The theme space construction unit 12 generates a search keyword set from the stored Web pages, searches the Web 30 by use of this search keyword set and the search keyword set from the search unit 11, and acquires and stores the URLs and document information of Web pages relating to the target theme. Here, the theme space construction unit 12 can choose from the Web pages relating to the target theme according to criterion such as closeness of the content of document information and word-based similarity. The theme space construction unit 12 constructs (extends) the theme space by words to be extracted from the Web pages thus acquired. The contents of the result report are therefore updated.

(1-6) Further, when repeating an automatic extension of the theme space, the theme space construction unit 12 generates a re-search keyword set back in (1-5), and repeats the process. With the automatic extension of the theme space, Web pages relating to the target theme are collected from the Web 30. It suffices to end the repetition of automatic extensions of the theme space on the basis of the number of times of repetition of the automatic extension process for the theme space or the like.

(2) When a user-unacquired information request concerning a target theme from the client terminal 20 is input to the search unit 11, (2-1) When a "user-acquired" history on the target theme does not exist in the theme information DB 13, the search unit 11 notifies to that effect and ends the process.

When a "user-acquired" history on the target theme exists in the theme information DB 13, the search unit 11 searches for user-unacquired Web pages within the target theme from the theme information DB 13. Whether the Web page has been acquired or has not been acquired is known based on whether a "user-acquired" flag has been applied.

(2-2) The exhaustivity calculation unit of the search unit 11 calculates a ratio of a user-acquired document group to a target theme-related document group as exhaustivity. Then, the search unit 11 transmits a result report containing the URLs and the exhaustivity of the user-unacquired Web pages to the client terminal 20. The result report may contain a difference and relevance concerning the user-unacquired Web pages.

(2-3) The client terminal 20 presents the result report transmitted from the search unit 11 to the user.

(2-4) The user can refer to the result report and browse a user-unacquired Web page or a specific part extracted therefrom. The user-acquired Web page is applied with a "user-acquired label," and fed back as user-acquired information to the theme space construction unit 12.

(2-5) The theme space construction unit 12 receives a user-acquired information feedback, and additionally stores the Web page determined to have been acquired in a "user-acquired" history within the theme information DB 13. The contents of the result report are therefore updated.

The present invention can be applied to a search service that searches for and provides information relating to a target theme among a wide variety of information.

What is claimed is:

1. An information filtering apparatus for collecting and filtering information relating to a target theme, comprising:
    an exhaustivity calculation unit comprising hardware of a computing device and configured to calculate exhaustivity as a ratio of a range of a user-acquired information group in a range of a target theme-related information group relating to the target theme, to the range of the target theme-related information group in a vocabulary space formed of a collection of words representing a ratio of a user-acquired part to an entire part of the target theme, based on the number of words contained in the range of the target theme-related information group and the number of words contained in the range of the user-acquired information group;
    a sending unit comprising hardware of the computing device and configured to send the exhaustivity calculated by the exhaustivity calculation unit to a client terminal; and
    a theme space construction unit comprising the hardware and configured to generate a search keyword set for searching for information relating to the target theme by using a "user-acquired" history based upon a feedback of information determined to have been acquired by a user, collect information by use of the search keyword set, and extract words relating to the target theme from the collected information to construct the range of the target theme-related information group, wherein the theme space construction unit has a unit that calculates importance of words in terms of the target theme by using TF-IDF and a thesaurus, and extracts the words relating to the target theme in consideration of the importance.

2. The information filtering apparatus of claim 1, further comprising a difference calculation unit comprising the hardware and configured to calculate a difference between the range of the user-acquired information group when a user has acquired target information and the range of the user-acquired information group before the user has acquired the target information, wherein the sending unit sends the difference calculated by the difference calculation unit together with the exhaustivity to the client terminal.

3. The information filtering apparatus of claim 1, further comprising a relevance calculation unit comprising the hardware and configured to calculate relevance of target information to the target theme, wherein the sending unit sends the relevance calculated by the relevance calculation unit together with the exhaustivity to the client terminal.

4. The information filtering apparatus of claim 1, further comprising a difference calculation unit comprising the hardware and configured to calculate a difference between the range of the user-acquired information group when a user has acquired target information and the range of the user-acquired information group before the user has acquired the target information, and a relevance calculation unit comprising the hardware and configured to calculate relevance of target information to the target theme, wherein the sending unit sends the difference calculated by the difference calculation unit and the relevance calculated by the relevance calculation unit together with the exhaustivity to the client terminal.

5. The information filtering apparatus of claim 4, wherein the sending unit makes the client terminal preferentially present information having a greater difference calculated by the difference calculation unit and having a greater relevance calculated by the relevance calculation unit.

6. The information filtering apparatus of claim 1, wherein the theme space construction unit further stores the words extracted by the theme space construction unit and the importance of the words calculated by the theme space construction unit, and information being a basis of the extracted words in a theme information database as theme information.

7. The information filtering apparatus of claim 6, wherein information to be stored in the theme information database is URLs of information used for the construction of the range of the target theme-related information group and contents in resources specified by the URLs, and a flag that has been applied to user-acquired information.

8. An information filtering apparatus for collecting and filtering information relating to a target theme, comprising:
    an exhaustivity calculation unit comprising hardware of a computing device and configured to calculate exhaustivity as a ratio of a sum of importance of words included in a user-acquired information group in a target theme-related information group relating to the target theme, to a sum of importance of words included in the target theme-related information group representing a ratio of a user-acquired part to an entire part of the target theme; and
    a sending unit comprising hardware of the computing device and configured to send the exhaustivity calculated by the exhaustivity calculation unit to a client terminal; and
    a theme space construction unit comprising the hardware and configured to generate a search keyword set for searching for information relating to the target theme by using a "user-acquired" history based upon a feedback of information determined to have been acquired by a user, collect information by use of the search keyword set, and extract words relating to the target theme from the collected information to construct the range of the target theme-related information group, wherein the theme space construction unit has a unit that calculates importance of words in terms of the target theme by using TF-IDF and a thesaurus, and extracts the words relating to the target theme in consideration of the importance.

9. The information filtering apparatus according to claim 8, wherein the target theme-related information group comprises a target theme-related web page group acquired in a web search using theme information.

10. An information filtering method for collecting and filtering information relating to a target theme the method comprising:

calculating, using hardware of a computing device, exhaustivity as a ratio of a range of a user-acquired information group in a range of a target theme-related information group relating to the target theme, to the range of the target theme-related information group in a vocabulary space formed of a collection of words representing a ratio of a user-acquired part to an entire part of the target theme, based on a number of words contained in the range of the target theme-related information group and the number of words contained in the range of the user-acquired information group;

sending, using the hardware, the exhaustivity to a client terminal; and generating with the hardware, a search keyword set for searching for information relating to the target theme by using a "user-acquired" history based upon a feedback of information determined to have been acquired by a user, collecting information by use of the search keyword set, and extracting words relating to the target theme from the collected information to construct the range of the target theme-related information group, wherein importance of words in terms of the target theme is calculated by using TF-IDF and a thesaurus, and the words relating to the target theme are extracted in consideration of the importance.

11. The information filtering method of claim 10, further comprising calculating using the hardware, a difference between the range of the user-acquired information group when a user has acquired target information and a range of the user-acquired information group before the user has acquired the target information and the difference is sent together with the exhaustivity to the client terminal.

12. The information filtering method of claim 10, further comprising calculating using the hardware, relevance of target information to the target theme and the relevance is sent together with the exhaustivity to the client terminal.

13. The information filtering method of claim 10, further comprising calculating using the hardware, a difference between the range of the user-acquired information group when a user has acquired target information and the range of user-acquired information group before the user has acquired the target information, and calculating using the hardware, relevance of target information to the target theme, and the difference and the relevance are sent together with the exhaustivity to the client terminal.

14. An information filtering method for collecting and filtering information relating to a target theme, comprising:

calculating using hardware of a computing device, exhaustivity as a ratio of a sum of importance of words included in a user-acquired information group in a target theme-related information group relating to the target theme, to a sum of importance of words included in the target theme-related information group representing a ratio of a user-acquired part to an entire part of the target theme;

sending, using the hardware, the exhaustivity to a client terminal; and generating with the hardware, a search keyword set for searching for information relating to the target theme by using a "user-acquired" history based upon a feedback of information determined to have been acquired by a user, collecting information by use of the search keyword set, and extracting words relating to the target theme from the collected information to construct the range of the target theme-related information group, wherein importance of words in terms of the target theme is calculated by using TF-IDF and a thesaurus, and the words relating to the target theme are extracted in consideration of the importance.

15. An information filtering apparatus for collecting and filtering information relating to a target theme, comprising:

an exhaustivity calculation unit comprising hardware of a computing device and configured to calculate exhaustivity as a ratio of a range of a user-acquired information group in a range of a target theme-related information group relating to the target theme, to the range of the target theme-related information group in a vocabulary space formed of a collection of words representing a ratio of a user-acquired part to an entire part of the target theme, based on the number of words contained in the range of the target theme-related information group and the number of words contained in the range of the user-acquired information group;

a difference calculation unit comprising the hardware and configured to calculate a difference between the range of the user-acquired information group when a user has acquired target information and the range of the user-acquired information group before the user has acquired the target information;

a relevance calculation unit comprising the hardware and configured to calculate relevance of target information to the target theme; and a sending unit comprising the hardware and configured to send the exhaustivity calculated by the exhaustivity calculation unit, the difference calculated by the difference calculation unit and the relevance calculated by the relevance calculation unit to the client terminal, wherein the sending unit makes the client terminal preferentially present information having a greater difference calculated by the difference calculation unit and having a greater relevance calculated by the relevance calculation unit.

* * * * *